(12) United States Patent
Mio et al.

(10) Patent No.: US 10,714,972 B2
(45) Date of Patent: Jul. 14, 2020

(54) POWER SUPPLY CONTROL APPARATUS

(71) Applicant: DENSO TEN Limited, Kobe-shi, Hyogo (JP)

(72) Inventors: Yasuki Mio, Kobe (JP); Gaoyang Mi, Zama (JP)

(73) Assignee: DENSO TEN Limited, Kobe-shi (JP)

( * ) Notice: Subject to any disclaimer, the term of this patent is extended or adjusted under 35 U.S.C. 154(b) by 42 days.

(21) Appl. No.: 16/262,020

(22) Filed: Jan. 30, 2019

(65) Prior Publication Data

US 2019/0245379 A1    Aug. 8, 2019

(30) Foreign Application Priority Data

Feb. 5, 2018  (JP) .................................. 2018-018587

(51) Int. Cl.
| | | |
|---|---|---|
| *H02J 7/00* | (2006.01) | |
| *G05F 3/08* | (2006.01) | |
| *H02J 9/06* | (2006.01) | |

(52) U.S. Cl.
CPC .................... *H02J 9/061* (2013.01)

(58) Field of Classification Search
CPC ........ H02J 2310/48; H02J 9/061; H02J 7/342; B60L 58/20; B60L 2210/10
See application file for complete search history.

(56) References Cited

U.S. PATENT DOCUMENTS

| | | | | |
|---|---|---|---|---|
| 9,450,509 B2* | 9/2016 | Kouno | .................. | H02M 7/483 |
| 2008/0093930 A1* | 4/2008 | Chen | ....................... | H02J 9/061 |
| | | | | 307/66 |
| 2014/0009106 A1* | 1/2014 | Andrea | .................. | H02J 7/0018 |
| | | | | 320/107 |
| 2014/0327390 A1* | 11/2014 | Park | ........................ | H02J 50/12 |
| | | | | 320/108 |
| 2016/0016483 A1* | 1/2016 | Yasunori | ................. | B60L 1/003 |
| | | | | 320/162 |
| 2017/0237128 A1* | 8/2017 | Kubo | ........................ | H02J 9/06 |
| | | | | 429/7 |
| 2018/0278065 A1* | 9/2018 | Hoyt | ...................... | H02J 7/0021 |
| 2019/0205393 A1* | 7/2019 | Wang | ................... | G06K 9/4628 |

FOREIGN PATENT DOCUMENTS

| | | |
|---|---|---|
| JP | 2003-032801 A | 1/2003 |
| JP | 2008-507447 A | 3/2008 |
| JP | 2010-183755 A | 8/2010 |
| JP | 2011-164008 A | 8/2011 |
| JP | 2011-254650 A | 12/2011 |
| JP | 2018-046635 A | 3/2018 |

* cited by examiner

*Primary Examiner* — Jared Fureman
*Assistant Examiner* — Esayas G Yeshaw
(74) *Attorney, Agent, or Firm* — Oliff PLC

(57) ABSTRACT

A power supply control apparatus according to the embodiment includes a microcomputer. The microcomputer is configured to: acquire switching information for switching a power supply pathway supplying power to a load between (i) a first pathway supplying power from a first battery to the load and (ii) a second pathway supplying power from a second battery to the load. When the microcomputer switches the power supply pathway between the first pathway and the second pathway, the microcomputer activates or deactivates a voltage converter while turning off a semiconductor relay so that power is supplied to the load through the first pathway via a body diode during a time period in which the voltage converter completes an activation process or a deactivation process.

12 Claims, 10 Drawing Sheets

POWER SUPPLY CONTROL APPARATUS

BACKGROUND OF THE INVENTION

Field of the Invention

The invention relates to a technology for controlling a power supply.

Description of the Background Art

Conventionally, a power supply control apparatus that has a first pathway for supplying power to an output terminal via a relay and a second pathway for supplying power to the output terminal via a step-up converter has been known. In the power supply control apparatus, when switching the first pathway to the second pathway, the step-up converter and the relay are controlled so that the relay is turned on simultaneously with operation of the step-up converter.

However, in the power supply control apparatus, when the step-up converter is activated and the relay is turned off before an output voltage of the step-up converter becomes sufficiently high, a voltage of the output terminal decreases and there is a possibility that a surge voltage is generated.

SUMMARY OF THE INVENTION

According to one aspect of the invention, a power supply control apparatus that controls a power supply includes a microcomputer. The microcomputer is configured to: acquire switching information for switching a power supply pathway supplying power to a load between (i) a first pathway supplying power from a first battery to the load and (ii) a second pathway supplying power from a second battery to the load, the first pathway including a plurality of switches, at least one of the plurality of switches being a semiconductor relay having a body diode and a switching element, the second pathway including a voltage converter, and based on the switching information, switch the power supply pathway between the first pathway and the second pathway by controlling the plurality of switches, and the voltage converter, wherein when the microcomputer switches the power supply pathway between the first pathway and the second pathway, the microcomputer activates or deactivates the voltage converter while turning off the semiconductor relay so that power is supplied to the load through the first pathway via the body diode during a time period in which the voltage converter completes an activation process or a deactivation process.

Thus, it is possible to suppress occurrence of a surge voltage.

Therefore, an object of the invention is to provide a power supply control apparatus that suppresses the occurrence of the surge voltage.

These and other objects, features, aspects and advantages of the invention will become more apparent from the following detailed description of the invention when taken in conjunction with the accompanying drawings.

DESCRIPTION OF THE EMBODIMENTS

In the following, an embodiment of a power supply control apparatus and a power supply control method disclosed in the application will be described with reference to the accompanying drawings. The invention is not limited to the embodiment described in the following.

Figure 1A:
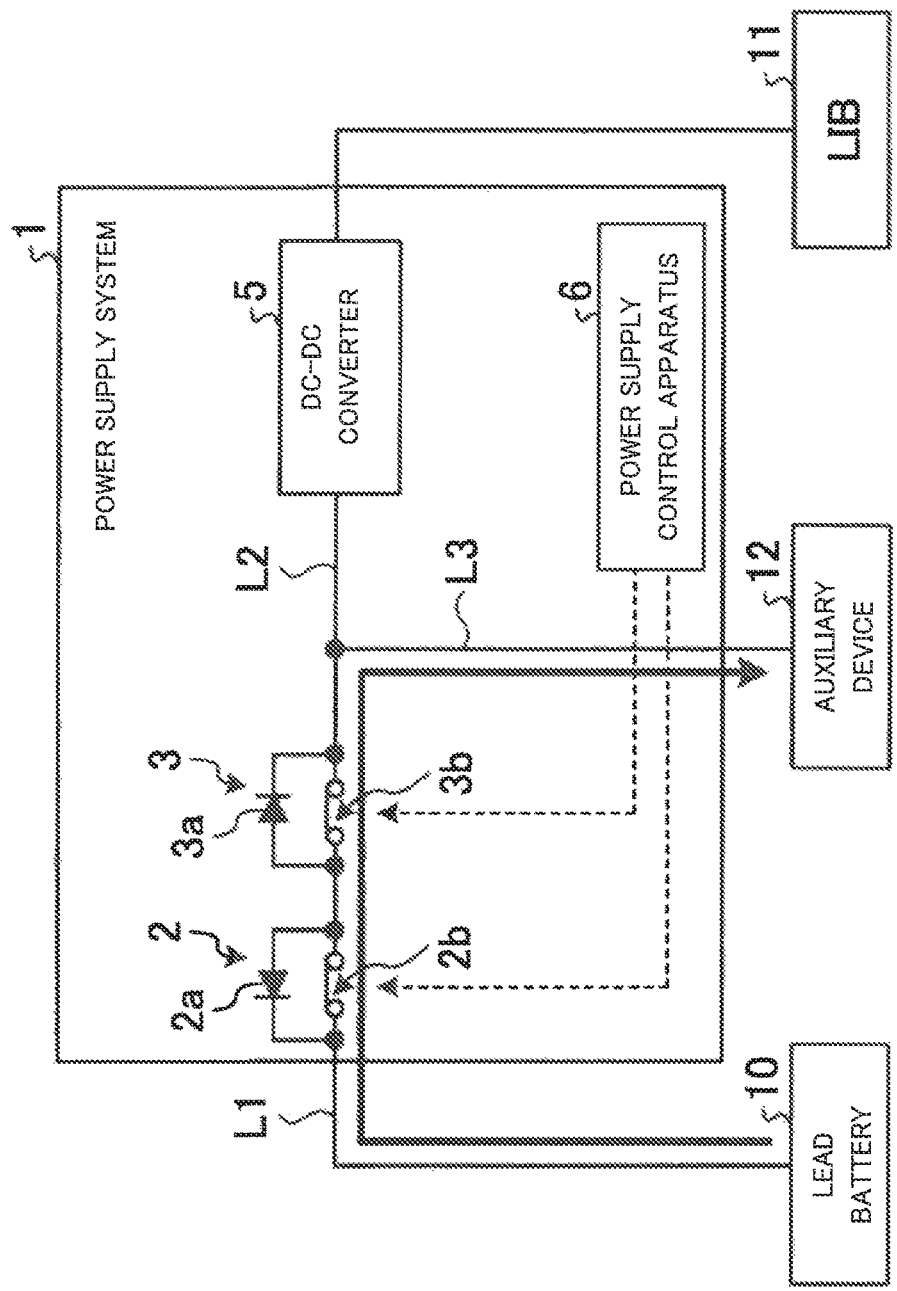
FIG. 1A illustrates a power supply state (No. 1) to an auxiliary device.
Figure 1B:
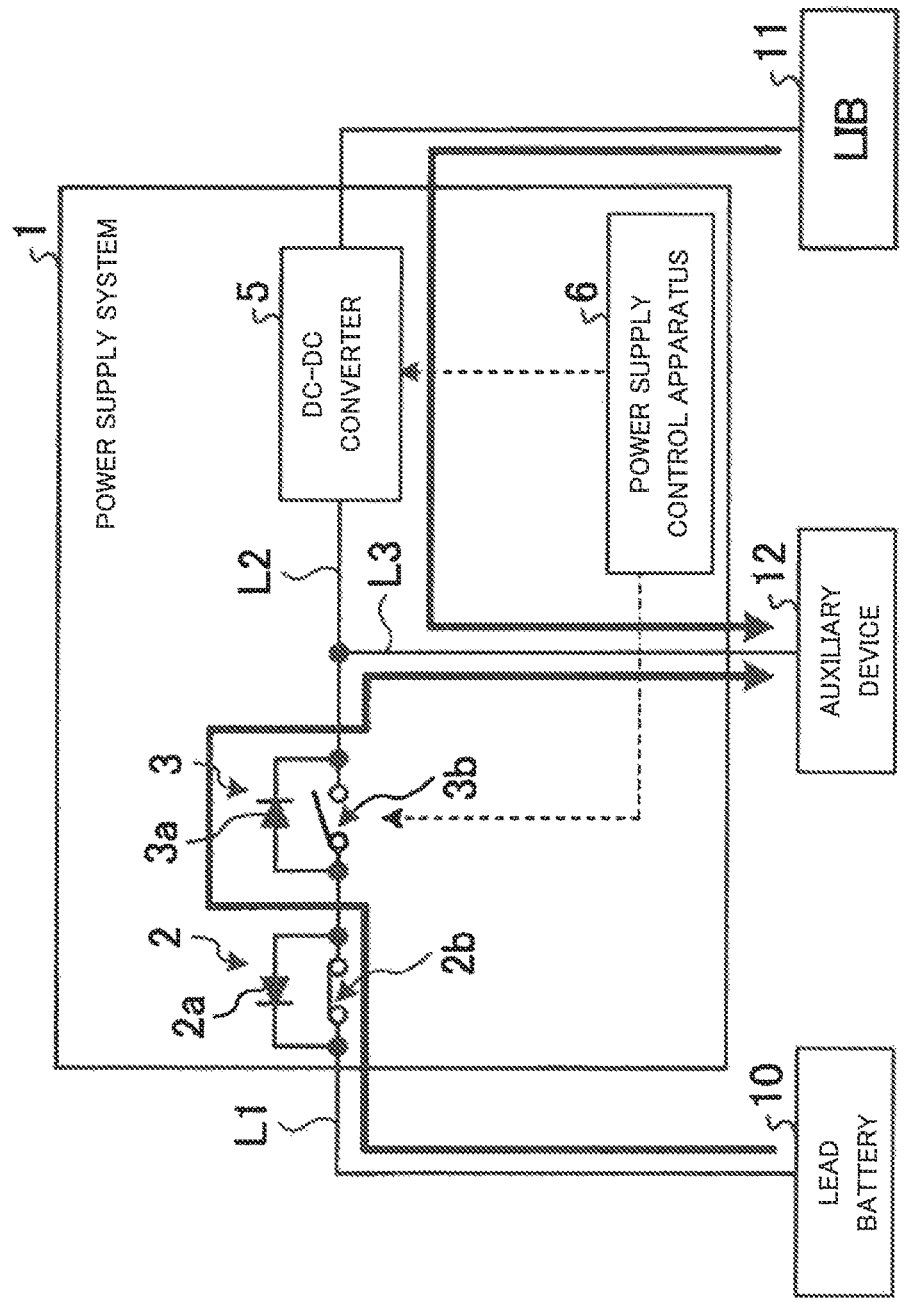
FIG. 1B illustrates a power supply state (No. 2) to the auxiliary device.
Figure 1C:
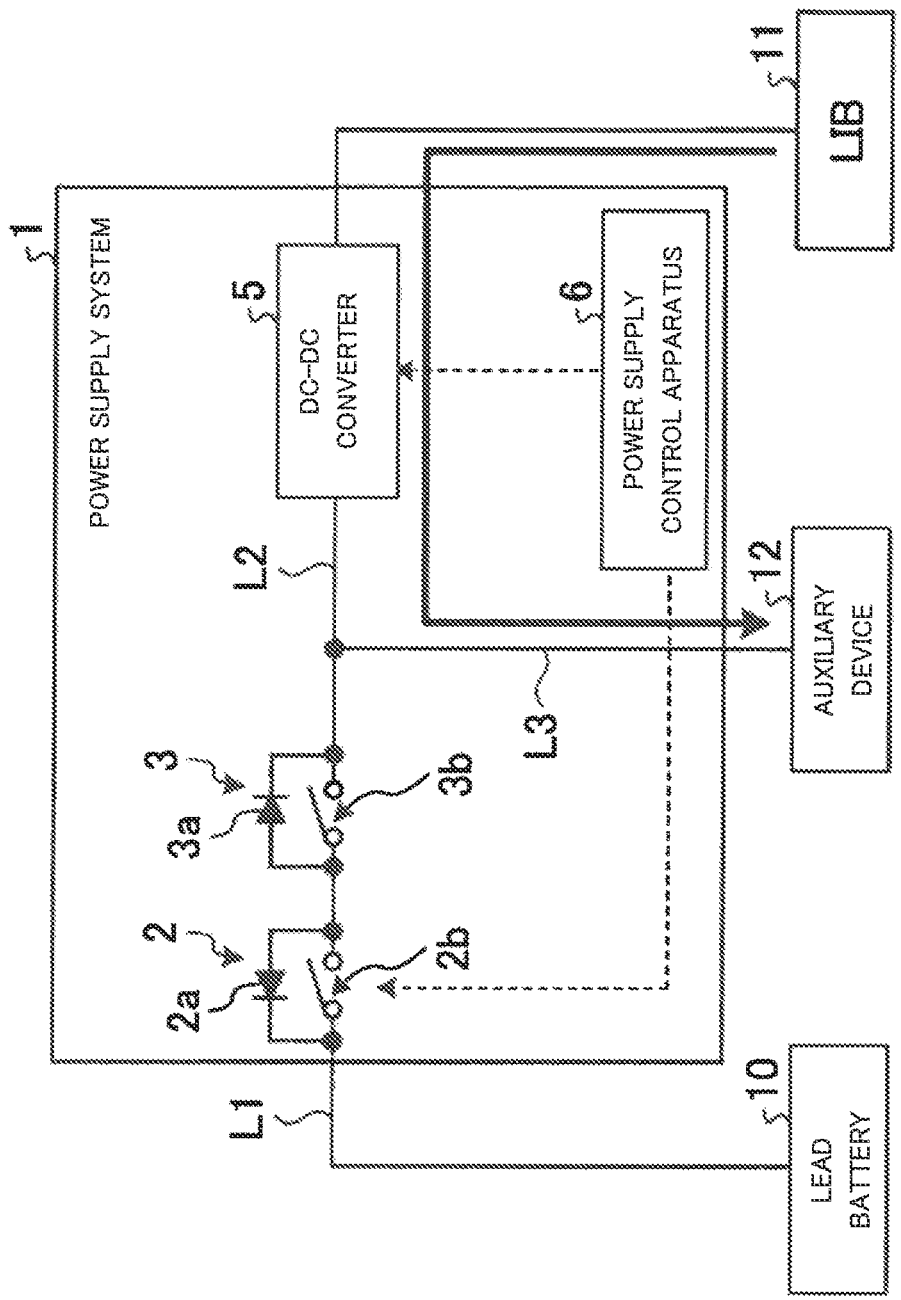
FIG. 1C illustrates a power supply state (No. 3) to the auxiliary device.

First, description will be made on an outline of the power supply control method executed by a power supply control apparatus 6 according to the embodiment with reference to FIG. 1A to FIG. 1C. FIG. 1A is a diagram illustrating a power supply state (No. 1) to an auxiliary device 12. FIG. 1B is a diagram illustrating a power supply state (No. 2) to the auxiliary device 12. FIG. 1C is a diagram illustrating a power supply state (No. 3) to the auxiliary device 12.

The power supply control apparatus 6 is mounted on a power supply system 1. The power supply system 1 is mounted on a vehicle having a lead battery 10 and an LIB 11. Here, the power supply system 1 that is mounted on the vehicle will be described as one example. However, the invention is not limited thereto. The power supply system 1 may be mounted on a transportation device other than the vehicle and may be applied to a system having a plurality of power supplies. The vehicle may be a hybrid vehicle or an electric vehicle.

The lead battery 10 is a secondary battery using lead as an electrode. The lead battery 10 is a main power supply of the auxiliary device 12 that is mounted on the vehicle. The lead battery 10 constitutes a first battery. The LIB 11 is a secondary battery using a lithium-ion battery. The LIB 11 is an auxiliary power supply for the lead battery 10. The LIB 11 constitutes a second battery. The lead battery 10 and the LIB 11 may be other secondary batteries, for example, a capacitor. The LIB 11 may be used as the main power supply and the lead battery 10 may be used as the auxiliary power supply.

The power supply control apparatus 6 switches a power supply pathway for supplying power to the auxiliary device 12 between a first pathway L1 and a second pathway L2.

The first pathway L1 is a pathway for supplying power from the lead battery 10 to the auxiliary device 12 via a third pathway L3 that is connected to the auxiliary device 12. The first pathway L1 is connected to the lead battery 10 and the third pathway L3. A first switch 2 and a second switch 3 are provided in the first pathway L1.

The first switch 2 is a semiconductor relay that has a body diode 2a and a switching element 2b. The second switch 3 is a semiconductor relay that has a body diode 3a and a switching element 3b.

In the first switch 2, the body diode 2a and the switching element 2b are arranged in parallel. In the second switch 3, the body diode 3a and the switching element 3b are arranged in parallel. The first switch 2 and the second switch 3 are provided in series in the first pathway L1. The body diode 2a of the first switch 2 is provided in a direction opposite to the body diode 3a of the second switch 3. That is, the body diode 2a is provided so that a current flows in a forward direction from the auxiliary device 12 to the lead battery 10, and the body diode 3a is provided so that a current flows in a forward direction from the lead battery 10 to the auxiliary device 12.

In the first switch 2, the body diode 2a is provided so that a current does not flow from the lead battery 10 to the auxiliary device 12 via the body diode 2a. In the second switch 3, the body diode 3a is provided so that a current is allowed to be supplied from the lead battery 10 to the auxiliary device 12 via the body diode 3a, that is, a reverse current from a side of the auxiliary device 12 to the lead battery 10 does not flow.

In the following, in the first switch 2 and the second switch 3, the switching element 2b and the switching element 3b are turned on, respectively, which means that the first switch 2 and the second switch 3 are turned on, respectively. The switching element 2b and the switching element 3b are turned off, respectively, which means that the first switch 2 and the second switch 3 are turned off, respectively.

The second pathway L2 is a pathway for supplying power from the LIB 11 to the auxiliary device 12 via the third pathway L3. The second pathway L2 is connected to the LIB 11 and the third pathway L3. A DC-DC converter 5 is provided in the second pathway L2.

The auxiliary device 12 is, for example, a navigation apparatus, an audio or an air conditioner. The auxiliary device 12 may be a control apparatus for performing autonomous driving when the vehicle is an autonomous driving vehicle. The auxiliary device 12 constitutes a load.

The DC-DC converter 5 is a voltage conversion apparatus for converting (step-down or step-up) a DC voltage (input voltage) into another DC voltage (output voltage).

When power is supplied to the auxiliary device 12 through the first pathway L1, the power supply control apparatus 6, as illustrated in FIG. 1A, turns on the first switch 2 and the second switch 3. In this state, the DC-DC converter 5 is not operating.

When the power supply control apparatus 6 switches the power supply pathway to the auxiliary device 12 from the first pathway L1 to the second pathway L2, the power supply control apparatus 6, as illustrated in FIG. 1B, activates the DC-DC converter 5 while turning off the second switch 3.

Thus, in the first pathway L1, a current flows through the body diode 3a of the second switch 3. The DC-DC converter 5 is activated, so that a current also flows through the second pathway L2. The power supply control apparatus 6 turns off the second switch 3 so as to prevent a reverse current flowing from the second pathway L2 to the first pathway L1.

Since power is supplied to the auxiliary device 12 via the body diode 3a of the second switch 3, the power supply control apparatus 6 can prevent an input voltage of the auxiliary device 12 from decreasing before activation of the DC-DC converter 5 is completed. That is, when the power supply control apparatus 6 switches the first pathway L to the second pathway L2, the power supply control apparatus 6 can suppress occurrence of a surge voltage that causes the input voltage of the auxiliary device 12 to decrease.

Then, after the activation of the DC-DC converter 5 has been completed, the power supply control apparatus 6, as illustrated in FIG. 1C, turns off the first switch 2. Thus, a current does not flow through the first pathway L1 and power is supplied from LIB 11 to the auxiliary device 12 through the second pathway L2.

The body diode 2a and the body diode 3a may be provided in a direction in which the body diode 2a and the body diode 3a face each other. That is, the body diode 2a may be provided so that a current flows in a forward direction from the lead battery 10 to the auxiliary device 12, and the body diode 3a may be provided so that a current flows in a forward direction from the auxiliary device 12 to the lead battery 10.

In this case, when the power supply control apparatus 6 switches the power supply pathway to the auxiliary device 12 from the first pathway L1 to the second pathway L2, the power supply control apparatus 6 activates the DC-DC converter 5 while turning off the first switch 2. That is, when the power supply control apparatus 6 switches the power supply pathway to the auxiliary device 12 from the first pathway L1 to the second pathway L2, the power supply control apparatus 6 turns off a switch having a body diode that allows a current to flow in a forward direction from the lead battery 10 to the auxiliary device 12. When the power supply control apparatus 6 switches the power supply pathway to the auxiliary device 12 from the second pathway L2 to the first pathway L1, the power supply control apparatus 6 similarly turns on a switch having a body diode that allows a current to flow in a forward direction from the lead battery 10 to the auxiliary device 12.

Figure 2:
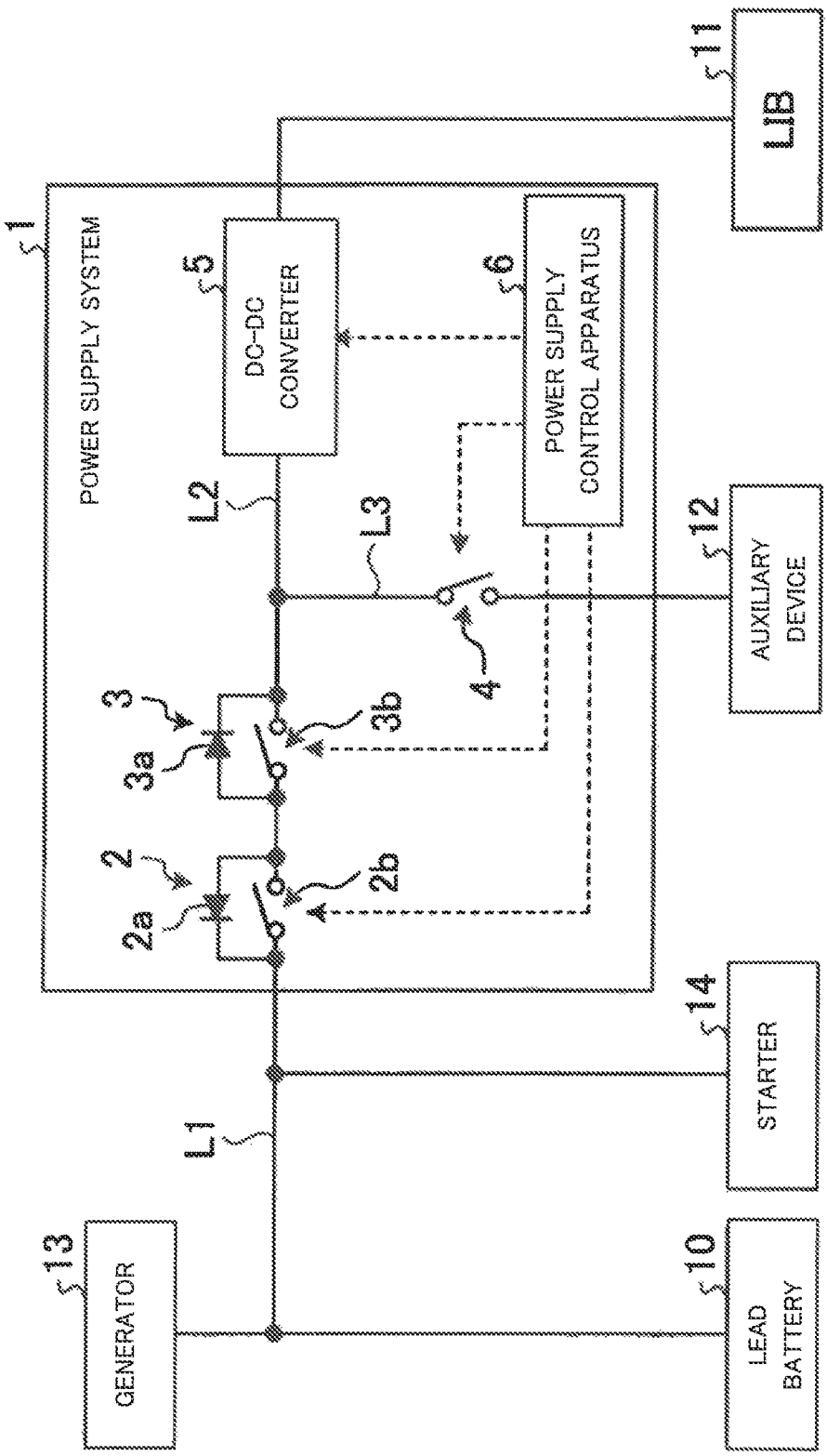
FIG. 2 is a block diagram illustrating an outline of a power supply system.

Next, description will be made on the power supply system 1 according to the embodiment with reference to FIG. 2. FIG. 2 is a schematic block diagram illustrating a configuration of the power supply system 1. The power supply system 1 controls power that is supplied from the lead battery 10 and the LIB 11 to the auxiliary device 12. The power supply system 1 is mounted on the vehicle that executes an idling stop for automatically stopping an engine (not shown) while the vehicle is stopped.

The lead battery 10 is supplied with power generated by a generator 13 and charged. The lead battery 10 supplies power to a starter 14 when the engine is started by the starter 14 in addition to supplying power to the auxiliary device 12.

LIB 11 is supplied with power generated by the generator 13 and charged. The LIB 11 supplies power to the auxiliary device 12, when power is supplied from the lead battery 10 to the starter 14 in order to start the engine, and the like.

The generator 13 is connected to the first pathway L1 and supplies generated power to the lead battery 10. The generator 13 supplies generated power to the LIB 11 via the first pathway L1 and the second pathway L2. The generator 13 may be a motor generator.

The starter 14 is connected to the first pathway L1 and supplied with power from the lead battery 10 when starting the engine. Instead of the generator 13 and the starter 14, an integrated starter generator (ISG) may be provided.

The power supply system 1 includes the first switch 2, the second switch 3, a third switch 4, the DC-DC converter 5 and the power supply control apparatus 6.

The first switch 2 and the second switch 3 are provided between a point to which the starter 14 is connected and a point to which the third pathway L3 is connected in the first pathway L1. The third switch 4 is provided in the third pathway L3. The third switch 4 is, for example, a semiconductor relay in a similar manner to the first switch 2 and the second switch 3. The third switch 4 may be a mechanical switch.

The power supply control apparatus 6 communicates with a vehicle control apparatus (not shown) provided in the vehicle, and controls the first switch 2, the second switch 3, the third switch 4 and the DC-DC converter 5 based on an external signal from the vehicle control apparatus.

Figure 3:
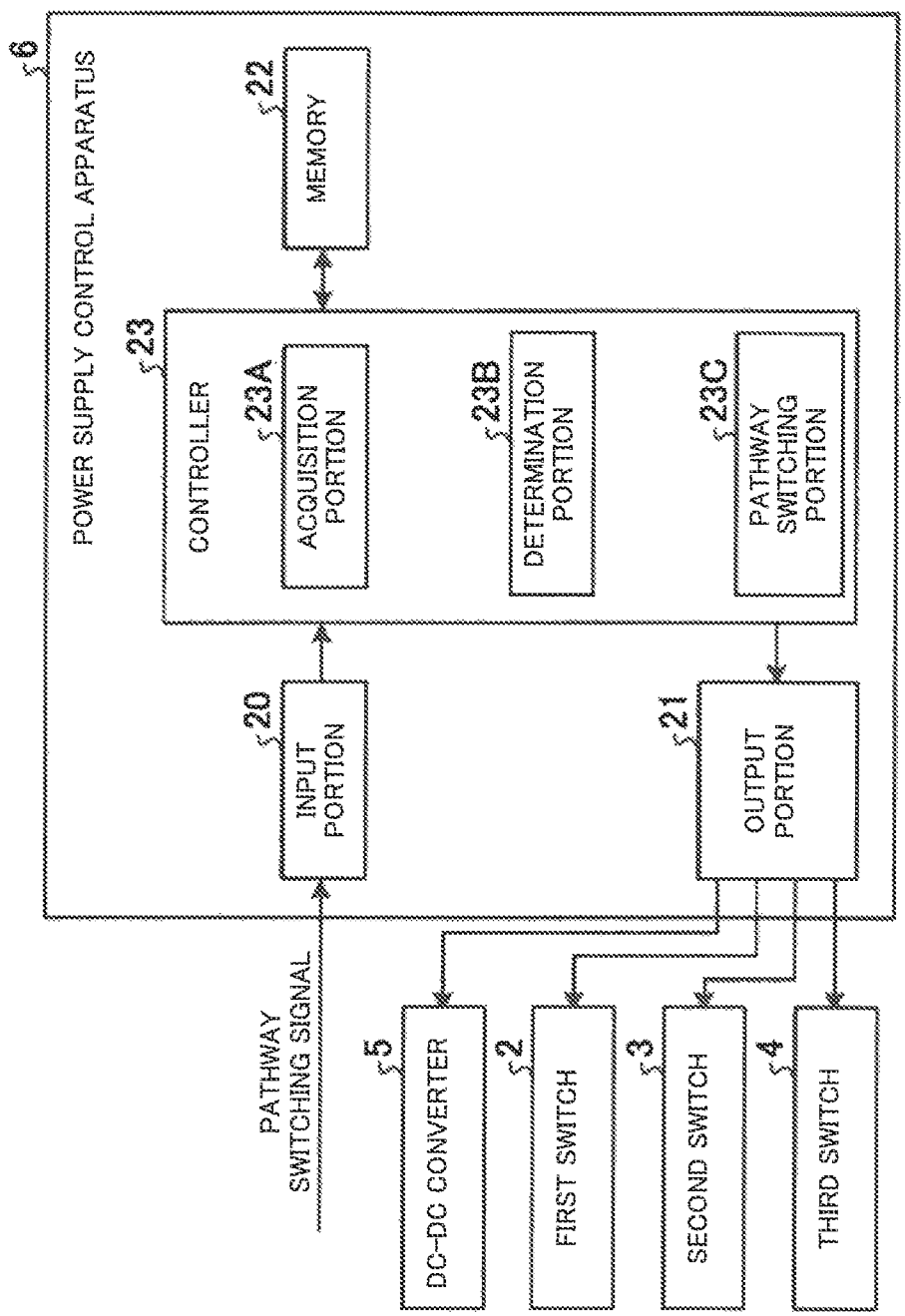
FIG. 3 is a block diagram illustrating an outline of a power supply control apparatus.

Next, description will be made on the power supply control apparatus 6 with reference to FIG. 3. FIG. 3 is a block diagram illustrating a configuration example of the power supply control apparatus 6.

The power supply control apparatus 6 includes an input portion 20, an output portion 21, a memory 22 and a controller 23.

A pathway switching signal that is switching information for switching the power supply pathway from the vehicle control apparatus to the auxiliary device 12 between the first pathway L1 and the second pathway L2 is input to the input portion 20. The pathway switching signal includes a signal for starting the engine, and the like.

The output portion 21 outputs a control signal for controlling the first switch 2, the second switch 3, the third switch 4 and the DC-DC converter 5.

The memory 22 is, for example, a memory device, such as a random access memory (RAM) or a data flash memory (a flash memory for storing data). The memory 22 stores information of various programs that are used in the power supply control apparatus 6, and the like.

The controller 23, for example, includes a microcomputer, which has a central processing unit (CPU), a read only memory (ROM), the RAM, input and output ports and the like, and various circuits. The controller 23 may be partly or entirely configured by hardware such as an application specific integrated circuit (ASIC), a field programmable gate array (FPGA), or the like.

The controller 23 uses the RAM as a work area to execute a program (not shown) stored in the ROM. The controller 23 includes a plurality of processors that function by executing this program. Specifically, the controller 23 includes an acquisition portion 23A, a determination portion 23B and a pathway switching portion 23C. The controller 23 may be configured by a plurality of controllers. Each processor may be configured by a plurality of processors, or may be integrated and configured.

The acquisition portion 23A acquires the pathway switching signal via the input portion 20.

The determination portion 23B determines whether or not the acquisition portion 23A has acquired the pathway switching signal. Specifically, the determination portion 23B determines whether or not the acquisition portion 23A has acquired the pathway switching signal for switching the power supply pathway from the first pathway L1 to the second pathway L2. The determination portion 23B also determines whether or not the acquisition portion 23A has acquired the pathway switching signal for switching the power supply pathway from the second pathway L2 to the first pathway L1.

When the DC-DC converter 5 has been activated, the determination portion 23B determines whether or not the activation of the DC-DC converter 5 has been completed. Specifically, the determination portion 23B determines whether or not a predetermined activation time has elapsed after the DC-DC converter 5 was activated. The predetermined activation time is a preset time and a time during which an output voltage in the second pathway L2 (i.e., an output voltage of the DC-DC converter 5) becomes equal to or higher than a target voltage. The target voltage is a preset voltage and, for example, the input voltage of the auxiliary device 12 (i.e., an output voltage in the first pathway L1) applied when power is supplied through the first pathway L1. The determination portion 23B determines that the activation of the DC-DC converter 5 has been completed when the predetermined activation time has elapsed after the DC-DC converter 5 was activated.

The predetermined activation time is set in consideration of a time during which the output voltage of the DC-DC converter 5 is stabilized. The target voltage and the predetermined activation time may be set for each auxiliary device 12. The determination portion 23B may determine whether or not the activation of the DC-DC converter 5 has been completed based on the output voltage of the DC-DC converter 5 and a signal from a voltage sensor (not shown) for detecting the input voltage of the auxiliary device 12.

The pathway switching portion 23C switches the power supply pathway to the auxiliary device 12 between the first pathway L1 and the second pathway L2 when the pathway switching signal has been acquired. When the pathway switching signal has been acquired, the pathway switching portion 23C generates a control signal for switching the first switch 2 to ON or OFF, and generates a control signal for switching the second switch 3 to ON or OFF. The pathway switching portion 23C generates a control signal for controlling the DC-DC converter 5. The generated signal is output to the first switch 2, the second switch 3 and the DC-DC converter 5 via the output portion 21.

In a normal time, for example, when the vehicle is travelling or when performing the idling stop, the pathway switching portion 23C turns on the first switch 2 and the second switch 3, and sets the power supply pathway to the first pathway L1 without operating the DC-DC converter 5.

When the pathway switching portion 23C switches the power supply pathway from the first pathway L1 to the second pathway L2, for example, when the engine is started by the starter 14, the pathway switching portion 23C activates the DC-DC converter 5 while turning off the second switch 3. For example, the pathway switching portion 23C activates the DC-DC converter 5 simultaneously when turning off the second switch 3, or after turning off the second switch 3. In other words, the pathway switching portion 23C turns off a switch (the second switch 3 in an example of FIG. 2) having a body diode through which a current flows in a forward direction from the lead battery 10 to the auxiliary device 12, and activates the DC-DC converter 5. Thus, power is supplied from the second pathway L2 to the auxiliary device 12 while power is supplied to the auxiliary device 12 through the first pathway L1 via the body diode 3a of the second switch 3.

When the activation of the DC-DC converter 5 has been completed, the pathway switching portion 23C turns off the first switch 2 so that power is not supplied to the auxiliary device 12 through the first pathway L1.

For example, when the engine is being started by the starter 14, the pathway switching portion 23C turns off the first switch 2 and the second switch 3, operates the DC-DC converter 5 and sets the power supply pathway to the second pathway L2.

When the pathway switching portion 23C switches the power supply pathway from the second pathway L2 to the first pathway L1, for example, when a start of the engine by the starter 14 has been completed, in a state in which the second switch 3 is turned off, the pathway switching portion 23C turns on the first switch 2 and deactivates the DC-DC converter 5. That is, when the pathway switching portion 23C switches the power supply pathway from the second pathway L2 to the first pathway L1, the pathway switching portion 23C sets a state in which power is supplied to the auxiliary device 12 through the first pathway L1 via the body diode 3a, and deactivates the DC-DC converter 5. When operation of the DC-DC converter 5 is deactivated, the pathway switching portion 23C turns on the second switch 3.

Figure 4:
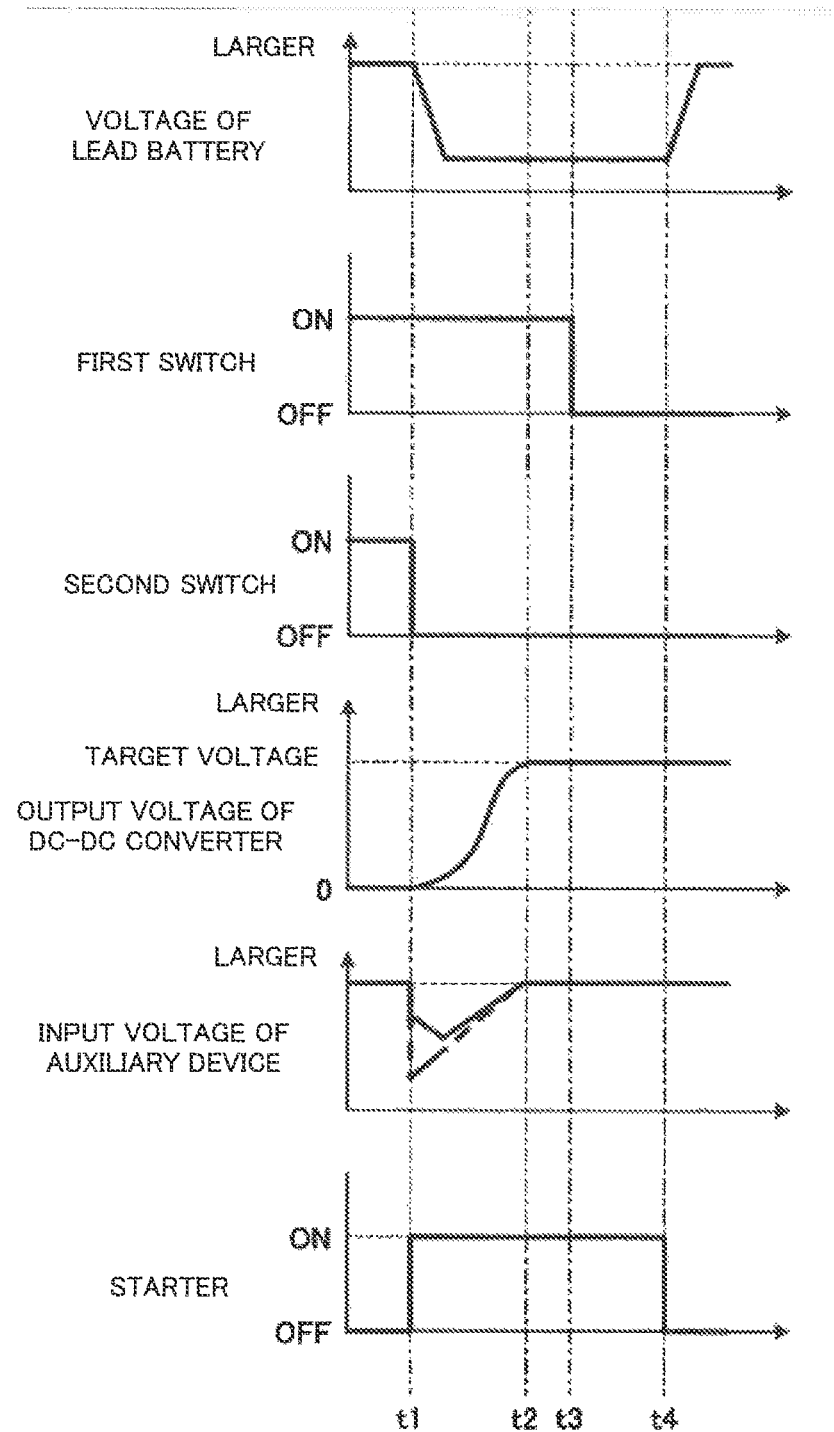
FIG. 4 is a timing chart illustrating supply of power.
Figure 5A:
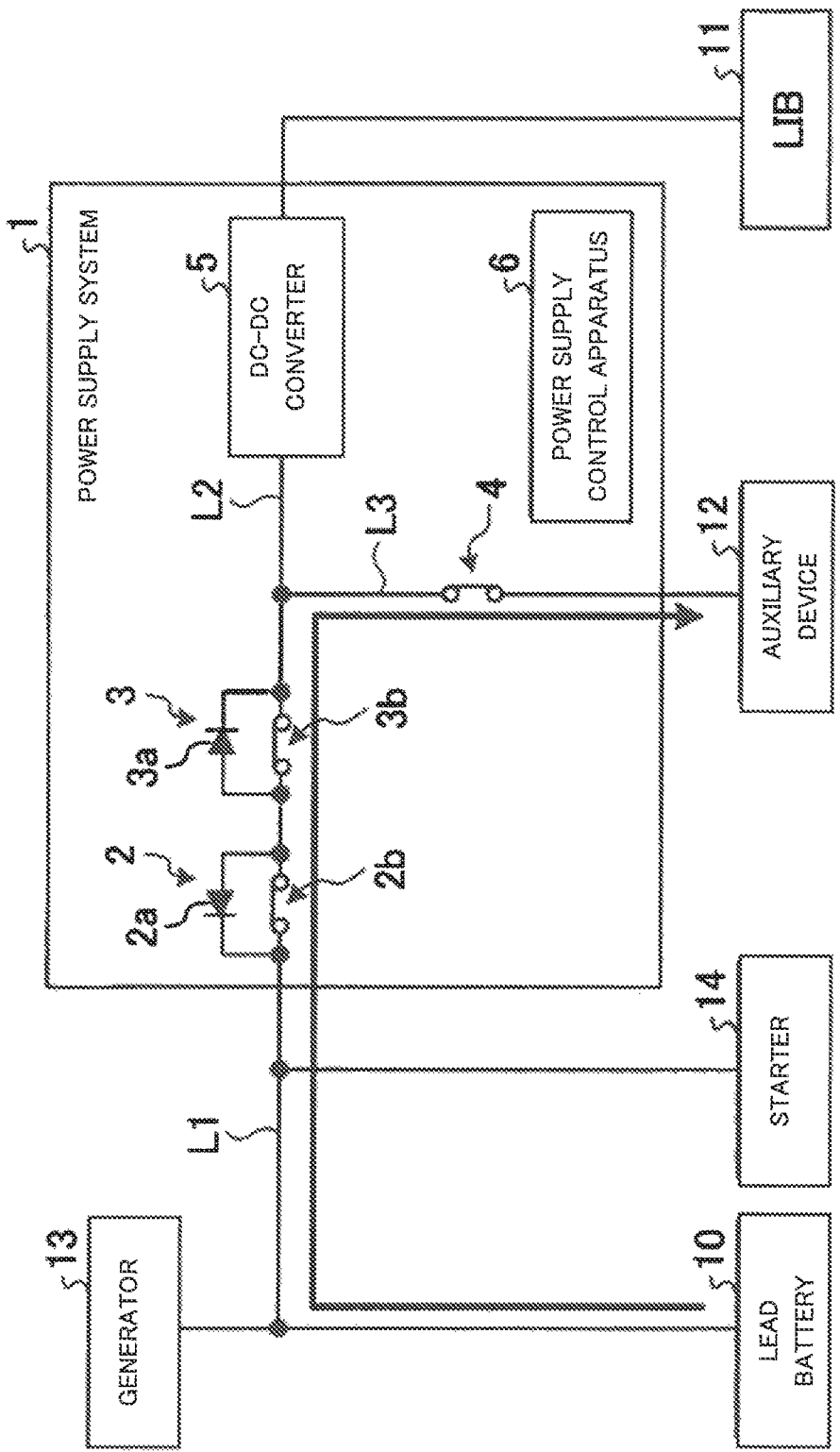
FIG. 5A illustrates a power supply state (No. 1)
Figure 5B:
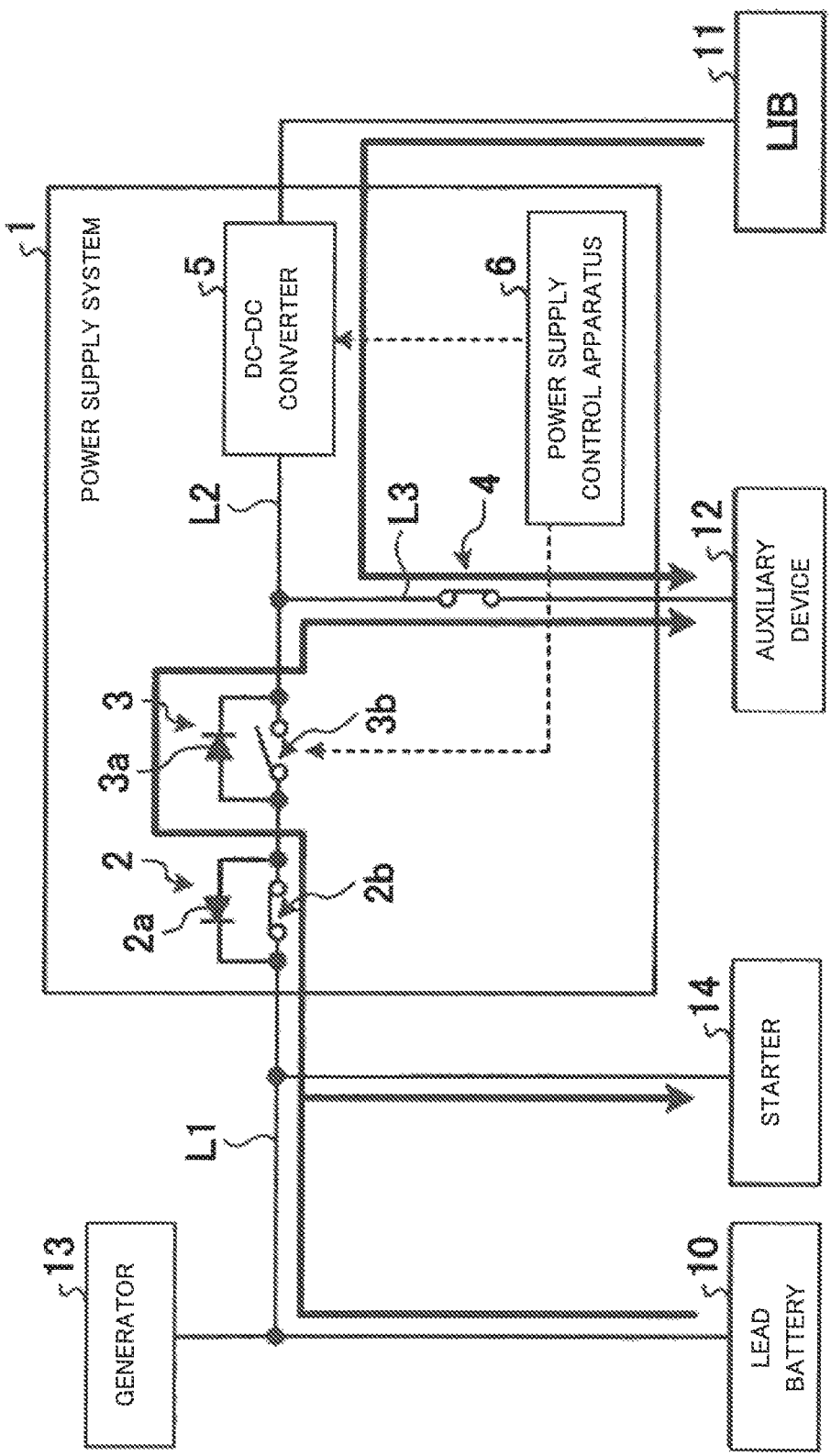
FIG. 5B illustrates a power supply state (No. 2)
Figure 5C:
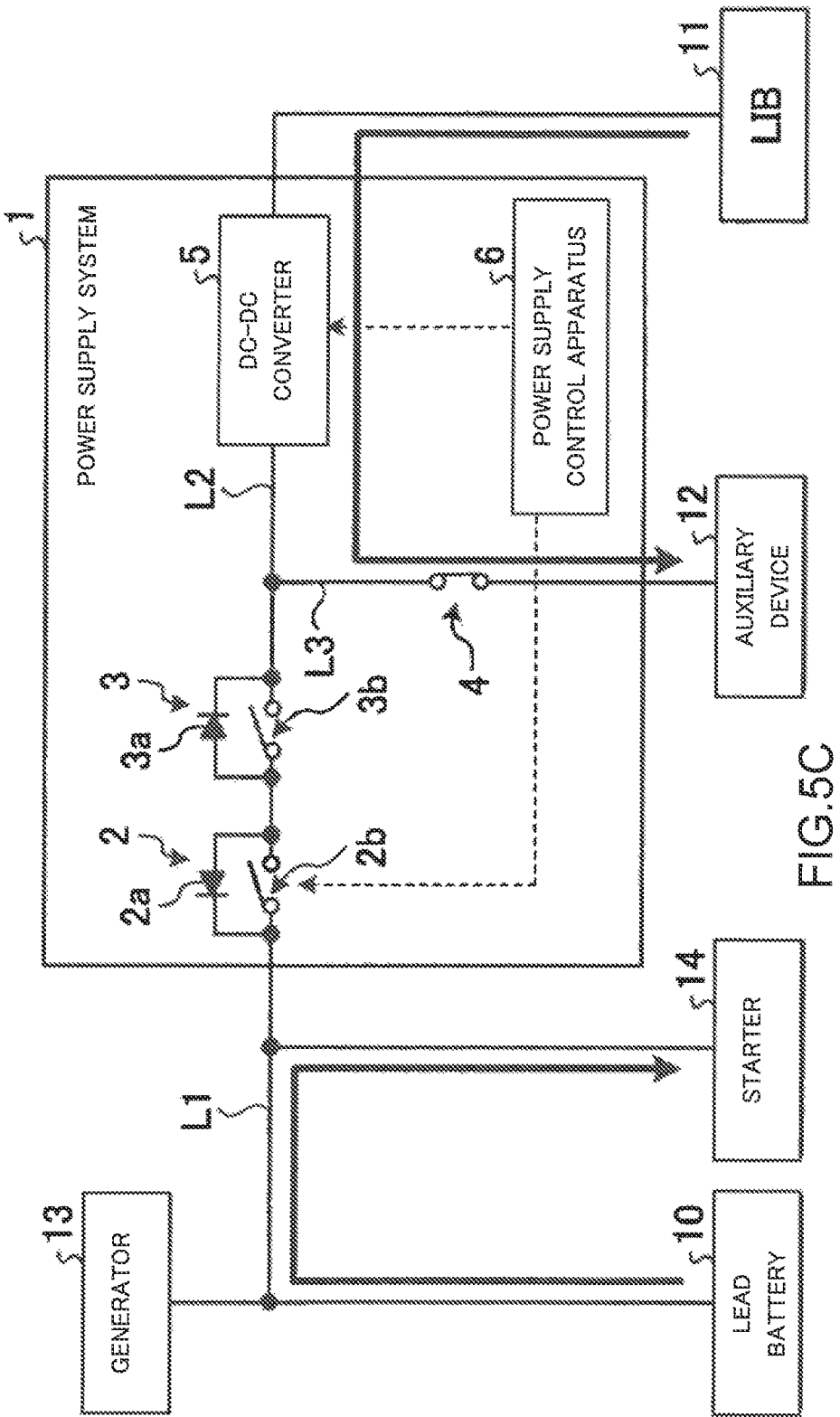
FIG. 5C illustrates a power supply state (No. 3)

Next, description will be made on power supply states in which the vehicle is performing the idling stop, and the vehicle ends the idling stop and starts the engine, with reference to FIG. 4, FIG. 5A, FIG. 5B and FIG. 5C. FIG. 4 is a timing chart illustrating supply of power. FIG. 5A is a diagram illustrating a power supply state (No. 1). FIG. 5B is a diagram illustrating a power supply state (No. 2). FIG. 5C is a diagram illustrating a power supply state (No. 3).

When performing the idling stop, the first switch 2, the second switch 3 and the third switch 4 are turned on, and, as illustrated in FIG. 5A, power is supplied to the auxiliary device 12 through the first pathway L.

When ending the idling stop at a time t1, the second switch 3 is turned off and the DC-DC converter 5 is activated. When the second switch 3 is turned off, a current flows through the body diode 3a in the second switch 3, so that the input voltage of the auxiliary device 12 decreases. The output voltage of the DC-DC converter 5 gradually increases, so that the input voltage of the auxiliary device 12 gradually increases.

The input voltage of the auxiliary device 12 in a comparative example in which the second switch 3 according to this embodiment is used as a mechanical switch is shown by a long dashed double-short dashed line in FIG. 4. In the comparative example, when the mechanical switch is turned off, power is not supplied through the first pathway L1, so that the input voltage of the auxiliary device 12 greatly decreases. That is, the surge voltage increases.

On the other hand, in this embodiment, since power is also supplied from the first pathway L1 via the body diode 3a of the second switch 3, a voltage decrease amount is only an amount (e.g., 0.7 V) reduced by the body diode 3a, and the surge voltage can be decreased compared to the comparative example.

At the time t1, the starter 14 is turned on in order to start the engine. Thus, a voltage of the lead battery 10 decreases. In this way, when the second switch 3 is turned off the DC-DC converter 5 is activated, and the starter 14 is turned on, as illustrated in FIG. 5B, power is supplied to the auxiliary device 12 through the first pathway L1 via the body diode 3a of the second switch 3, and through the second pathway L2. Power is also supplied from the lead battery 10 to the starter 14.

At a time t2, the output voltage of the DC-DC converter 5 becomes the target voltage, and the input voltage of the auxiliary device 12 becomes a voltage applied. when power is supplied through the first pathway L1. In FIG. 4 the starter 14 is turned on at the time t1. However, after the DC-DC converter 5 is activated, for example, after the output voltage of the DC-DC converter 5 becomes near the target voltage, the starter 14 may be turned on.

At a time t3, when a predetermined activation time has elapsed after the DC-DC converter 5 was activated and the activation of the DC-DC converter 5 has been completed, the first switch 2 is turned off. Thus, as illustrated in FIG. 5C, power is not supplied to the auxiliary device 12 through the first pathway L1, and power is supplied to the auxiliary device 12 through the second pathway L2. Power is also supplied from the lead battery 10 to the starter 14.

At a time t4, when the start of the engine by the starter has been completed, the starter 14 is turned off. Thus, the voltage of the lead battery 10 recovers.

Figure 6:
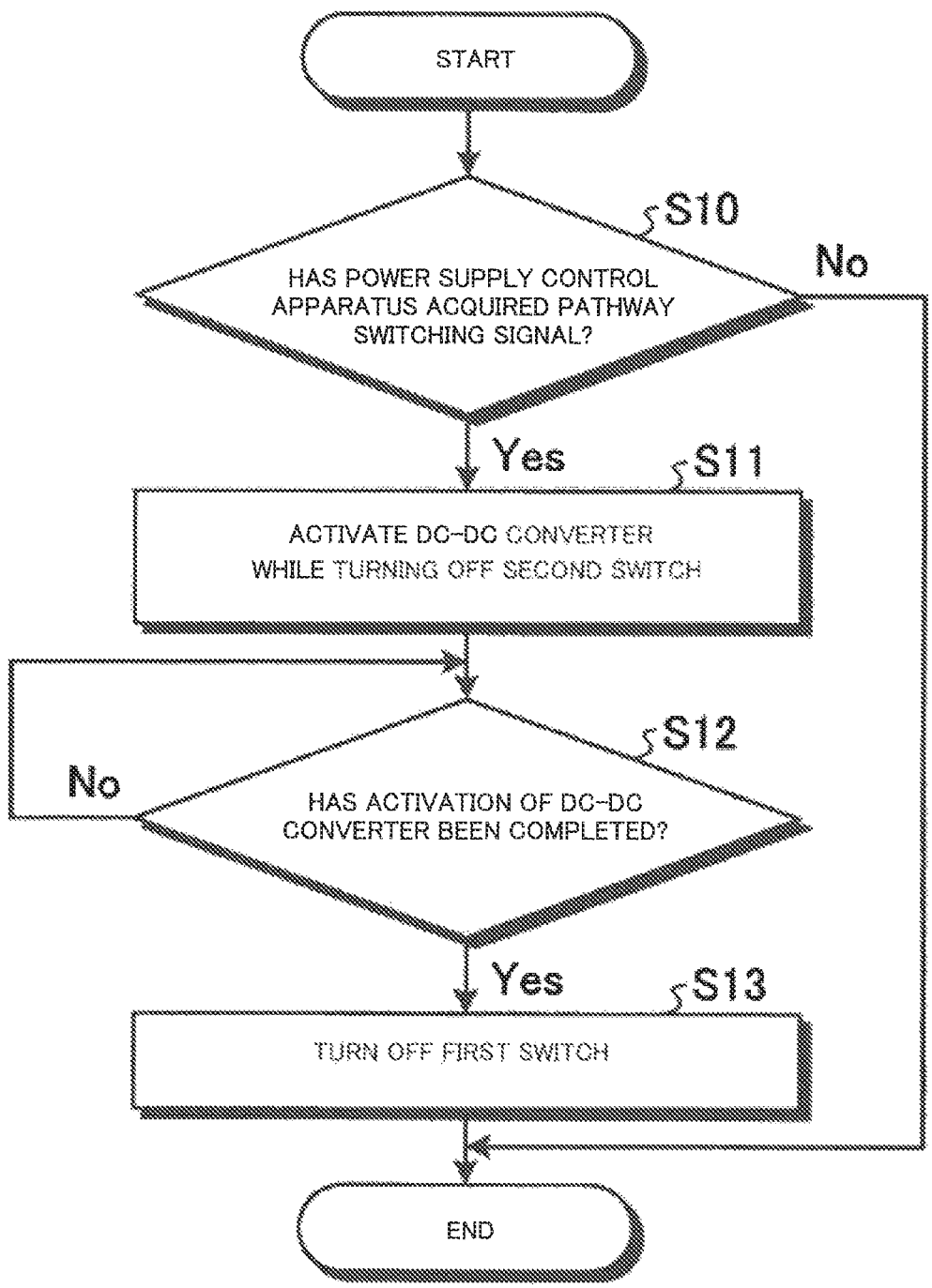
FIG. 6 is a flowchart illustrating pathway switching control.

Next, description will be made on pathway switching control for switching the power supply pathway from the first pathway L1 to the second pathway L2 with reference to FIG. 6. FIG. 6 is a flowchart illustrating the pathway switching control.

The power supply control apparatus 6 determines whether or not the acquisition portion 23A has acquired the pathway switching signal for switching the power supply pathway from the first pathway L1 to the second pathway L2 (a step S10). When the power supply control apparatus 6 has not acquired the pathway switching signal for switching the power supply pathway from the first pathway L1 to the second pathway L2 (No in the step S10), the power supply control apparatus 6 ends the process.

When the power supply control apparatus 6 has acquired the pathway switching signal for switching the power supply pathway from the first pathway L to the second pathway L2 (Yes in the step S10), the power supply control apparatus 6 activates the DC-DC converter 5 while turning off the second switch 3 (a step S11).

The power supply control apparatus 6 determines whether or not the activation of the DC-DC converter 5 has been completed (a step S12). When the activation of the DC-DC converter 5 has not been completed (No in the step S12), the power supply control apparatus 6 repeats determination (the step S12).

When the activation of the DC-DC converter 5 has been completed (Yes in the step S12), the power supply control apparatus 6 turns off the first switch 2 (a step S13).

When the power supply control apparatus 6 switches the power supply pathway between the first pathway L1 and the second pathway L2, the power supply control apparatus 6 activates or deactivates the DC-DC converter 5 while turning off the second switch 3 so that power is supplied to the auxiliary device 12 via the body diode 3a. For example, when the power supply control apparatus 6 switches the power supply pathway from the first pathway L1 to the second pathway L2, the power supply control apparatus 6 activates the DC-DC converter 5 while turning off the second switch 3. The power supply control apparatus 6 turns off the first switch 2 after the activation of the DC-DC converter As a result, when the power supply control apparatus 6 switches the power supply pathway from the first pathway L1 to the second pathway L2, the power supply control apparatus 6 can suppress the occurrence of the surge voltage. The power supply control apparatus 6 can prevent the reverse current flowing from the second pathway L2 to the first pathway L1. For example, the power supply control apparatus 6 activates the DC-DC converter 5 simultaneously when turning off the second switch 3 or after turning off the second switch 3 so as to prevent the reverse current flowing from the second pathway L2 to the first pathway L1.

When the output voltage of the DC-DC converter 5 becomes equal to or higher than the target voltage, and the activation of the DC-DC converter 5 has been completed, the power supply control apparatus 6 turns off the first switch 2. Thus, the power supply control apparatus 6 can prevent the first switch 2 from being turned off in a state in which the output voltage of the DC-DC converter 5 is small, and suppress the occurrence of the surge voltage.

When the power supply control apparatus 6 switches the power supply pathway from the second pathway L2 to the first pathway L1, in the state in which the second switch 3 is turned off, the power supply control apparatus 6 turns on the first switch 2 and deactivates the DC-DC converter 5. Thus, when the power supply control apparatus 6 switches the power supply pathway from the second pathway L2 to the first pathway L1, the power supply control apparatus 6 can prevent the reverse current flowing from the second pathway L2 to the first pathway L1.

When a power supply control apparatus 6 according to a modified example switches a power supply pathway from a first pathway L1 to a second pathway L2, the power supply control apparatus 6 according to the modified example turns off a second switch 3 after activating a DC-DC converter 5. In this way, when the power supply control apparatus 6 switches the power supply pathway from the first pathway L1 to the second pathway L2, the power supply control apparatus 6 according to the modified example may activate the DC-DC converter 5 while turning off the second switch 3. Specifically, the power supply control apparatus 6 according to the modified example calculates a difference between an output voltage in the first pathway L1 (an output voltage of the second switch 3) and an output voltage in the second pathway L2 (an output voltage of the DC-DC converter 5). When the difference is a value for suppressing a surge voltage and becomes equal to or lower than a preset predetermined value, the power supply control apparatus 6 according to the modified example turns off the second switch 3. Thus, the power supply control apparatus 6 according to the modified example can further suppress occurrence of the surge voltage while preventing a reverse current flowing from the second pathway L2 to the first pathway L1.

In a state in which power is supplied to an auxiliary device 12 through the first pathway L1, for example, when the output voltage in the first pathway L1 becomes lower than a preset failure detection voltage (predetermined voltage) due to failure of the first pathway L1 or a lead battery 10, the power supply control apparatus 6 according to the modified example switches the power supply pathway from the first pathway L1 to the second pathway L2. A method of switching the power supply pathway is similar to the embodiment described above. Thus, when failure occurs in the first pathway L1, and the like, and the power supply pathway is switched from the first pathway L1 to the second pathway L2, the power supply control apparatus 6 according to the modified example can suppress the occurrence of the surge voltage while continuing to supply power to the auxiliary device 12. The power supply control apparatus 6 according to the modified example can prevent the reverse current flowing from the second pathway L2 to the first pathway L1.

In the embodiment described above, the first switch 2 and the second switch 3 are provided in the first pathway L1. However, the invention is not limited thereto, and three or more switches may be provided. The first switch 2 may be a mechanical switch.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. A power supply control apparatus that controls a power supply, the power supply control apparatus comprising a microcomputer configured to:
   acquire switching information for switching a power supply pathway supplying power to a load between (i) a first pathway supplying power from a first battery to the load and (ii) a second pathway supplying power from a second battery to the load; the first pathway including a plurality of switches, at least one of the plurality of switches being a semiconductor relay having a body diode and a switching element, the second pathway including a voltage converter; and
   based on the switching information, switch the power supply pathway between the first pathway and the second pathway by controlling the plurality of switches, and the voltage converter, wherein
   when the microcomputer switches the power supply pathway between the first pathway and the second pathway, the microcomputer activates or deactivates the voltage converter while turning off the semiconductor relay so that power is supplied to the load through the first pathway via the body diode during a time period in which the voltage converter completes an activation process or a deactivation process.

2. The power supply control apparatus according to claim 1, wherein
   when the microcomputer switches the power supply pathway from the first pathway to the second pathway, the microcomputer activates the voltage converter while turning off the semiconductor relay so that power is supplied to the load through the first pathway via the body diode, and turns off the plurality of switches so that power is not supplied through the first pathway to the load after the activation process of the voltage converter is completed.

3. The power supply control apparatus according to claim 2, wherein
   when an output voltage in the second pathway becomes equal to or higher than a target voltage after activating the voltage converter, the microcomputer turns off the plurality of switches.

4. The power supply control apparatus according to claim 2, wherein
   when a difference between a first output voltage in the first pathway and a second output voltage in the second pathway becomes equal to or lower than a predetermined value, the microcomputer turns off the semiconductor relay.

5. The power supply control apparatus according to claim 1, wherein
   in a state in which power is supplied to the load through the first pathway, when an output voltage in the first pathway becomes lower than a predetermined voltage, the microcomputer switches the power supply pathway from the first pathway to the second pathway.

6. The power supply control apparatus according to claim 1, wherein
   when the microcomputer switches the power supply pathway from the second pathway to the first pathway, in a state in which the semiconductor relay is turned off so that power is supplied to the load through the first pathway via the body diode, the microcomputer turns on remaining switches of the plurality of switches and deactivates the voltage converter.

7. A power supply control method for controlling a power supply, the method comprising the steps of:
   (a) acquiring, by a microcomputer, switching information for switching a power supply pathway supplying power to a load between (i) a first pathway supplying power from a first battery to the load and (ii) a second pathway supplying power from a second battery to the load, the first pathway including a plurality of switches, at least one of the plurality of switches being a semiconductor relay having a body diode and a switching element, the second pathway including a voltage converter; and
   (b) based on the switching information, switching, by the microcomputer, the power supply pathway between the first pathway and the second pathway by controlling the plurality of switches, and the voltage converter, wherein when the step (b) switches the power supply pathway between the first pathway and the second pathway, the step (b) activates or deactivates the voltage converter while turning off the semiconductor relay so that power is supplied to the load through the first pathway via the body diode during a time period in which the voltage converter completes an activation process or a deactivation process.

8. The power supply control method according to claim 7, wherein when switching the power supply pathway from the first pathway to the second pathway, the voltage converter is activated while turning off the semiconductor relay so that power is supplied to the load through the first pathway via the body diode, and the plurality of switches are turned off so that power is not supplied through the first pathway to the load after the activation process of the voltage converter is completed.

9. The power supply control method according to claim 8, wherein when an output voltage in the second pathway becomes equal to or higher than a target voltage after activating the voltage converter, the plurality of switches are turned off.

10. The power supply control method according to claim 8, wherein when a difference between a first output voltage in the first pathway and a second output voltage in the second pathway becomes equal to or lower than a predetermined value, the semiconductor relay is turned off.

11. The power supply control method according to claim 7, wherein in a state in which power is supplied to the load through the first pathway, when an output voltage in the first pathway becomes lower than a predetermined voltage, the power supply pathway is switched from the first pathway to the second pathway.

12. The power supply control method according to claim 7, wherein when the power supply pathway is switched from the second pathway to the first pathway, in a state in which the semiconductor relay is turned off so that power is supplied to the load through the first pathway via the body diode, remaining switches of the plurality of switches are turned on and the voltage converter is deactivated.

* * * * *